US010421575B2

(12) United States Patent
Steiner et al.

(10) Patent No.: US 10,421,575 B2
(45) Date of Patent: Sep. 24, 2019

(54) CONTAINER AND LINKAGE CONSISTING OF A NUMBER OF CONTAINERS

(71) Applicant: MEDINOXX GMBH, Innsbruck (AT)

(72) Inventors: Gottfried Steiner, Spielberg (AT); Jens Häfner, Innsbruck (AT)

(73) Assignee: MEDINOXX GMBH, Innsbruck (AT)

( * ) Notice: Subject to any disclaimer, the term of this patent is extended or adjusted under 35 U.S.C. 154(b) by 0 days.

(21) Appl. No.: 15/744,701

(22) PCT Filed: Jul. 12, 2016

(86) PCT No.: PCT/EP2016/066543
§ 371 (c)(1),
(2) Date: Jan. 12, 2018

(87) PCT Pub. No.: WO2017/009340
PCT Pub. Date: Jan. 19, 2017

(65) Prior Publication Data
US 2018/0208348 A1    Jul. 26, 2018

(30) Foreign Application Priority Data

Jul. 15, 2015  (AT) ................................ A 50624/2015

(51) Int. Cl.
*B65D 1/30*     (2006.01)
*B29C 45/16*    (2006.01)
(Continued)

(52) U.S. Cl.
CPC ............... *B65D 1/30* (2013.01); *B29C 45/16* (2013.01); *B65D 11/02* (2013.01); *B65D 43/163* (2013.01);
(Continued)

(58) Field of Classification Search
CPC ...... B65D 1/30; B65D 43/163; B65D 43/169; B65D 77/208; B65D 11/02; B65D 2543/00296; B65D 2543/00842; B65D 2543/00194; B65D 2543/00509; B29C 45/16; B29C 2045/1601; B29L 2031/7132; Y10S 206/82; Y10S 206/807;
(Continued)

(56) References Cited

U.S. PATENT DOCUMENTS 2,467,678 A * 4/1949 Lockhart ............... A61M 5/002
                                              206/366
2,825,450 A * 3/1958 Long ........................ B41J 31/10
                                              220/23.8
(Continued)

FOREIGN PATENT DOCUMENTS

CH         680848 A5   11/1992
DE    102009022384 A1  11/2010
(Continued)

*Primary Examiner* — Chun Hoi Cheung
*Assistant Examiner* — Brijesh V. Patel
(74) *Attorney, Agent, or Firm* — Maschoff Brennan (57) ABSTRACT

Container for packing of liquid, pasty or solid substances or small parts with a cup made of plastic, which is liquid-tight and can be sealed with a sealing film made of plastic. The container has a cover with a stable, plastic edge part, which can be detached from the cup and attached liquid-tight to the upper edge of the container, on the surface of which sealing film can be welded on liquid-tight.

15 Claims, 10 Drawing Sheets

(51) Int. Cl.
  *B65D 8/00* (2006.01)
  *B65D 77/20* (2006.01)
  *B65D 43/16* (2006.01)
  *B29L 31/00* (2006.01)

(52) U.S. Cl.
  CPC ......... *B65D 43/169* (2013.01); *B65D 77/208* (2013.01); *B29C 2045/1601* (2013.01); *B29L 2031/7132* (2013.01); *B65D 2543/00296* (2013.01); *B65D 2543/00842* (2013.01)

(58) Field of Classification Search
  CPC .......................... Y10S 229/927; A61M 5/002; A61M 5/3202; A61J 1/03; A61J 1/035; A61J 7/006; A61J 2205/30
  USPC ........ 206/364–366, 438, 443, 486–490, 528, 206/538–539, 540, 363, 367, 380–383, 206/280; 220/23.2, 23.4, 23.83; 604/171, 192, 199, 263, 239–243; 229/125.35, 123.1, 120.011, 123.3; 128/919
  See application file for complete search history.

(56) References Cited

U.S. PATENT DOCUMENTS

| | | | | |
|---|---|---|---|---|
| 3,021,001 A | * | 2/1962 | Donofrio | B65D 1/30 206/820 |
| 3,054,679 A | * | 9/1962 | Bradford | B65D 71/70 206/558 |
| 3,101,870 A | * | 8/1963 | Betner | B65D 77/2028 220/269 |
| 3,114,455 A | * | 12/1963 | Stagg | A61M 5/3202 206/366 |
| 3,660,960 A | * | 5/1972 | Inman | B65B 9/042 220/23.4 |
| 3,844,408 A | * | 10/1974 | Relyea | B65D 1/22 206/486 |
| 4,349,119 A | | 9/1982 | Letica | |
| 4,735,318 A | * | 4/1988 | Keffeler | A61J 1/03 206/532 |
| 4,863,036 A | * | 9/1989 | Heijenga | B65D 77/2036 229/123.1 |
| 5,085,348 A | | 2/1992 | Huerlimann | |
| 5,325,965 A | * | 7/1994 | Kelley | A61M 5/3205 206/366 |
| 5,538,129 A | * | 7/1996 | Chester | A61C 19/02 206/469 |
| 5,543,104 A | * | 8/1996 | Stratford | B65D 1/30 249/130 |
| 5,582,317 A | | 12/1996 | Wermund | |
| 5,702,017 A | * | 12/1997 | Goncalves | B65D 1/30 206/820 |
| 5,722,553 A | * | 3/1998 | Hovatter | B01L 3/5021 220/23.8 |
| 6,364,113 B1 | * | 4/2002 | Faasse, Jr. | B65D 73/0057 206/459.1 |
| 7,353,969 B2 | * | 4/2008 | McHutchinson | B65D 83/0463 221/25 |
| 7,802,695 B2 | * | 9/2010 | Baker | B65D 1/30 220/23.4 |
| 8,887,912 B2 | * | 11/2014 | Chapin | A61M 5/002 206/365 |
| 9,211,375 B2 | * | 12/2015 | Finke | A61M 5/008 |
| 2003/0141218 A1 | * | 7/2003 | Stephens | B65D 1/30 206/484 |
| 2006/0086640 A1 | * | 4/2006 | Luciano, Jr. | A61J 7/0069 206/534 |
| 2007/0095719 A1 | | 5/2007 | Colavito | |
| 2011/0113734 A1 | | 5/2011 | Bellamah | |
| 2011/0174819 A1 | * | 7/2011 | Murphy | B65D 43/0254 220/270 |
| 2013/0105345 A1 | * | 5/2013 | Van der Beek | A61M 5/002 206/366 |
| 2013/0299499 A1 | | 11/2013 | Elliott | |
| 2014/0061215 A1 | | 3/2014 | Chang | |

FOREIGN PATENT DOCUMENTS

| | | |
|---|---|---|
| EP | 0299571 A1 | 1/1989 |
| EP | 1013562 A2 | 6/2000 |
| EP | 2266889 A2 | 12/2010 |
| EP | 2319675 A1 | 5/2011 |
| EP | 2377775 A1 | 10/2011 |
| EP | 2479120 A1 | 7/2012 |
| FR | 2733715 | 11/1996 |
| GB | 2172837 A | 10/1986 |
| JP | 200498663 A | 4/2004 |
| WO | 2013107897 A1 | 7/2013 |

\* cited by examiner

VIa - VIa

VIIa - VIIa

VIIIa - VIIIa

IXa - IXa

Fig. 12

CONTAINER AND LINKAGE CONSISTING OF A NUMBER OF CONTAINERS

The invention relates to a container for the packing of liquid, pasty or solid substances or of small parts, which has a cup made of plastic and a cover that can be sealed liquid-tight made of plastic, wherein the cover has an edge part that is provided with a level surface and a sealing element that is connected liquid-tight to the surface of the edge part. Furthermore, the invention relates to a linkage made up of a plurality of containers arranged in a row.

From EP 2 194 952 B1, a system is known, which has an insert (tray) with individual compartments spaced away from each other and a plurality of individual containers, which are held in the compartments, can be individually removed and contain the substance to be packaged, in particular, a medication. In order to retain the individual containers in the compartments in a detachable manner and protect them from unintended detachment, an individual flexible film is provided, which is attached in a sealing manner and extends across the insert, which contains the compartments and across all individual containers contained therein. The film is provided with a perforation in such a way that a selected removal of individual containers is made possible while the other containers are retained and remain sealed. In the case of a further system on the market, each individual container is sealed with a special reliable self-adhesive which can however be detached. Each film is provided with the necessary information concerning the contents and the patient in order to prevent mix ups. The corresponding tray offers space for twenty-eight containers filled with medications, which are individually filled and packed. A special welding device seals the individual containers with the special film so that each container can be taken from the tray individually without damaging the other containers or their film. This known system offers containers for taking four doses of medication, thereby not allowing the care of patients that must take five or six doses of medication. The known systems result in a lot and a very voluminous amount of plastic waste. The previously welded sealing film must be removed in order to open the containers, wherein the opening force is relatively high in the one hand, and can considerably fluctuate from container to container. The gripping surface available to open the sealing film is small due to the construction at hand. Removing the film requires skill so that if the containers are filled with medications, above all elderly patients requiring care cannot remove the film themselves. Furthermore, when opening, the liquid contained within the container can be easily spilled out.

The object of the invention is to make a container of the aforementioned type available, which should be especially well-suited for use within a modular system, which can be easily and reliably opened with the same amount of opening force for all containers during use and is nevertheless sealed liquid-tight with a plastic film, which can be provided with the necessary information regarding the contents of the container. If the containers are filled with medications, they should also be able to be opened easily by people requiring care.

The given task is solved according to the invention by the cup together with the edge part of the cover being manufactured in a two-component injection-moulding process, wherein the sealing element is a sealing film, which can subsequently be welded onto the surface of the edge part, in particular, after filling the cup.

In the case of a container designed according to the invention, a stable cover, which can be detached from the cup is provided, onto the edge part of which the transparent sealing film can be welded. The stability of the edge part allows for easy opening of the containers with the same amount of opening force for all containers. A spilling of liquid from the cup can considerably be prevented by means of this. In the case of a container designed according to the invention, the sealing film is welded on after filling the cup and forms the cover along with the edge part; however, the film is not removed for opening, rather the completely stable cover is detached from the cup.

In the case of a preferred embodiment of the invention, the edge part of the cover can be re-attached the upper edge of the cup. In contrast to known containers, which can no longer be sealed as a result of removing the film in order to open them, the cover of the designed containers according to the invention can re-attached to the cup after opening. This has the advantage that contents which are not taken in their entirety may furthermore be stored securely.

With reference to this, an embodiment of the invention is particularly preferred, where the edge part is connected liquid-tight to the upper edge of the cup by means of a tongue/groove connection in a re-attachable manner. In another preferred embodiment of the invention, the edge part of the cover is connected liquid-tight to an upper edge of the cup by means of a snap/ring connection in a re-attachable manner. Both variants can be manufactured easily and inexpensively.

In another favourable embodiment variant of the invention, the edge part is designed in such a way that it protrudes beyond the upper edge of the cup toward the outside. An embodiment is especially favourable, where the edge part abuts the inner side of the cup wall in a flush manner so that, above all, liquids can be emptied without leaving any residue.

In another favourable embodiment of the invention, the edge part of the cover has a level outer surface so that liquid-tight welding of the sealing film is easily possible.

Furthermore, an embodiment of the container is particularly favourable where a tamper-proof seal is provided, which visibly changes its external appearance when opening the cover for the first time. In this way, it can be reliably determined if the container is still originally sealed or if it is already been opened.

Variations with the tamper-proof seal are particularly easy to manufacture, where the tamper-proof seal has at least one component, which can be removed, detached or plastically deforms when removing the cover for the first time.

In the case of one embodiment of the invention, the tamper-proof seal has a sealing part designed on the edge part of the cover, which is connected to a sealing part held on the outer side of the cup wall via a predetermined breaking point.

In the case of other well visible variants of the tamper-proof seal, this is formed as a two-layer tab spaced away from the edge of the edge part, having an upper tab component made out of the material of the edge part and a lower tab part made of the material of the cup, wherein the upper tab component detaches either from the lower tab component or from the edge part when the cover is opened for the first time.

Furthermore, an embodiment is especially preferred, where the cup wall is formed on an area toward the upper edge of the cup and toward the outside, thereby forming a spout. On the one hand, this embodiment allows for drinking without spilling liquid from the cup and, on the other, pouring liquid without spilling it, for example, into another container.

Furthermore an embodiment of the container according to the invention is especially favourable, where the edge part of the cover is widened on a local level at one point, especially within the area of the spout, thereby forming a pull tab to open the cover. In a particularly favourable way, the application of force into the original fluid-tight connection of the cover in the cup takes place via the pull tab designed like this in such a way that an effortless removal and detachment of the cover from the cup is possible.

In order to prevent losing the cover after removal, it is advantageous if the edge part of the cover is connected to the upper edge of the cup with a hinge-like connection, for example, at the area opposite to the spout.

Spillage-free storage of the container can be ensured by the cup having a particularly ring-type circumferentially or cylindrically designed foot.

In order to secure the container against loss during transport on a tray or the like, various measures can be taken according to the invention. In this way, at least one flat area forming a type of undercut can be formed on the outer side of the cup wall, in particular, near the upper edge of the cup. Furthermore, at least one groove running parallel to the edge of the cup can be formed within the flat area. Such flat areas are preferably formed on the areas of the cup wall opposite to each other. Corresponding snap points, projections and the like are formed on the tray, which allow for the cups to be snapped in on the tray in a detachable manner.

Furthermore, the containers are designed in such a way that they can be stacked inside of each other. Such a measure consists of the cup being designed to become broader toward the upper edge of the cup.

Furthermore, the invention relates to a linkage made up of a plurality of containers arranged in a row, which are designed according to the invention, wherein the edge parts of adjacent containers are respectively connected to each other on a local level via at least one thin spot made of the material of the edge parts. In this way, a plurality of container linkages, which are stacked within each other belonging to the point where the respective contents are introduced can be made available in a space-saving manner. These thin points are designed in such a way that they can be easily separated thermally or mechanically.

In the case of a possible embodiment of the invention, the thin points are designed as bars. In another favourable embodiment variant of the invention, the thin points are designed as arched or folded plastic skins. Thereby, the thin points allow for a compensation of manufacturing tolerances between the container linkage and a tray or the holder of a welding apparatus to weld on the sealing film.

Manufacturing the cups along with the edge parts in a two-component injection-moulding process is particularly advantageous, since it is inexpensive and simple.

It is especially preferred to use the containers or the container linkages according to the invention within a modular system to prepare pharmaceutical or medical products.

Other features, advantages and details of the invention are now described in detail using the schematic drawing, which portrays the exemplary embodiments of the invention. The figures show.

The invention deals with the design of containers, in particular, for use in a modular system for the preparation of portioned liquids, solid or pasty substances, preferably of medications in liquid or solid form. especially powders, globules, pills and the like, but also cream-like medications. If the system used for the preparation of drugs, it can be particularly used in a particularly advantageous way, especially at in-patient facilities, such as nursing homes, homes for the elderly and the like, but also in the private sector. In containers according to the invention however, other products and substances can be packed than medications, for example foodstuff, cosmetic items, electronic components and the like. The present invention primarily relates to a particularly innovative design of containers, wherein in the case of using several containers in a system, a so-called tray, a tray-like crafted apparatus to transport and store the containers is also part of the system, which is, however, beyond the scope of this invention.

The individual container 1 shown in FIGS. 1 to 6, 2a and 5a consist of a cup 2 and a cover 3. The cup 2 is manufactured from a transparent plastic material, for example, and has a holding capacity for up to 15 ml of fluid shown, as an example for the portrayed embodiment Furthermore, the cup 2 has a cup wall 2a, a cup floor 2b and a circumferential foot 4 in the area of the floor 2b. The cup wall 2a is cylindrically designed to be directly at the floor 2b to form the foot 4 and subsequently has a diameter growing in the direction of the upper edge. To determine the fill level in the case of liquids, milliliter specifications are stamped or printed onto the wall of the cup 2 with corresponding scale marks. Furthermore, the cup wall 2a is formed at one point of its circumference outwardly toward the upper edge and in this way, forms a spout 5 (FIG. 5) for direct removal of a fluid, for example, a fluid medication, wherein the spout 5 can also be used for the spillage-free pouring of liquid from the cup 2, in particular, into another container. If the floor 2b of the cup 2 is shifted somewhat upwards, a hollow space can be created within the foot 4 so that the cup 2 is positioned on the tray in a radial groove or over a projection adapted to the hollow space, thereby securing against loss, for example, during transport.

The cover 3 has an edge part 6 adapted to the contour of the upper edge surrounding the upper edge of the cup 2, which is connected liquid-tight to the upper edge of the cup 2, however in a detachable manner. In the embodiment shown in FIG. 2, the edge part 6 has a circumferential connection edge part base piece 7, which comprises the edge of the cup 2 with two edge part base pieces 7, 7' as a tongue/group connection and is tightly seated on the upper edge of the cup 2. Thereby, the edge part base piece 7' of the edge part 6 sits on a circumferential section 2c (FIG. 6) formed on the edge of the cup 2 on the inside so that the edge inside of the cup of the edge part 6 abuts with the inner side of the cup wall 2a in a flush manner. Therefore, the edge part 6 having a width $b_1$ of roughly 2 mm to roughly 4 mm outwardly protrudes the upper edge of the cup 2 and has a level surface 6a. After filling the container 1, a transparent sealing film 8, for example, is welded onto the surface 6a sealing the cup 2, which is shown in the FIGS. 1 to 6. In the area of the spout 5, the edge part 6 is widened on a local level and forms a pull tab 6b here to remove or open the cover 3.

Figure 2:
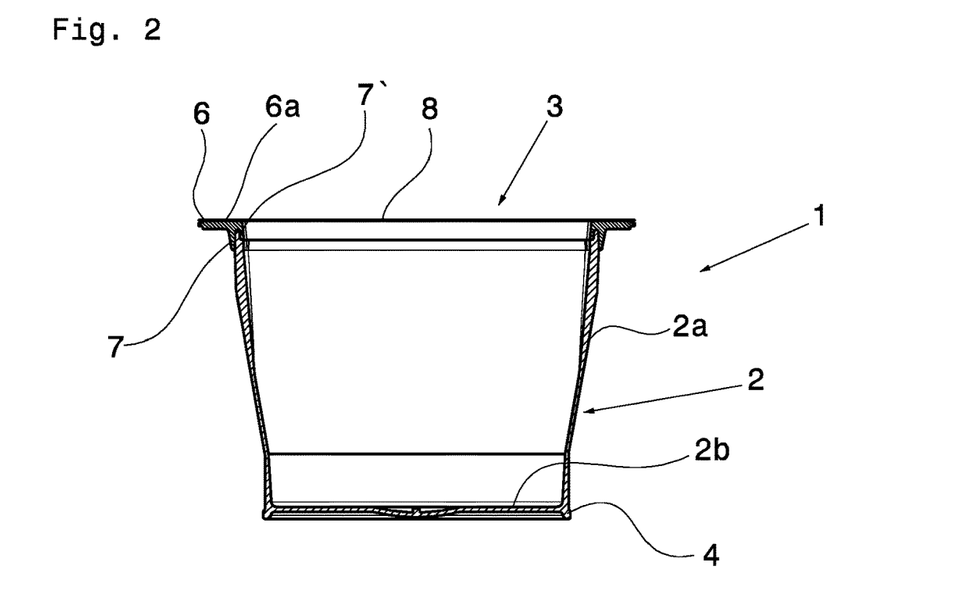
Figure 2A:
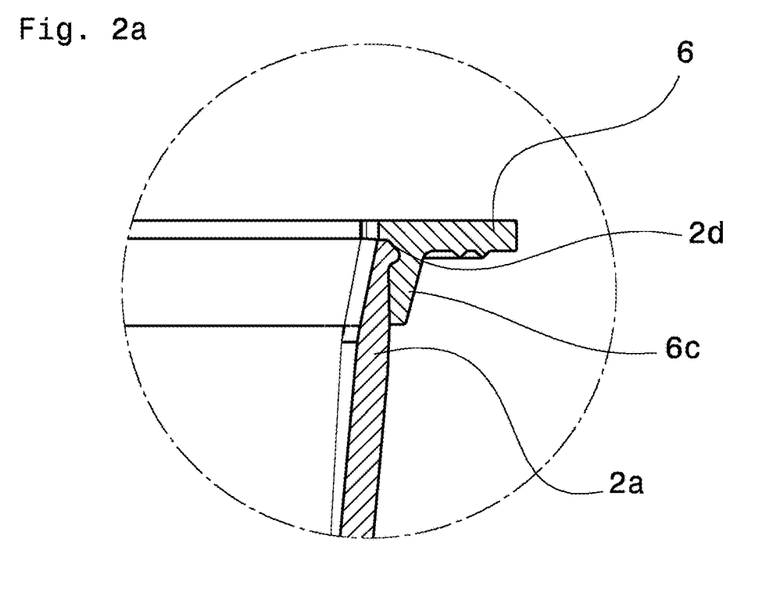
Figure 3:
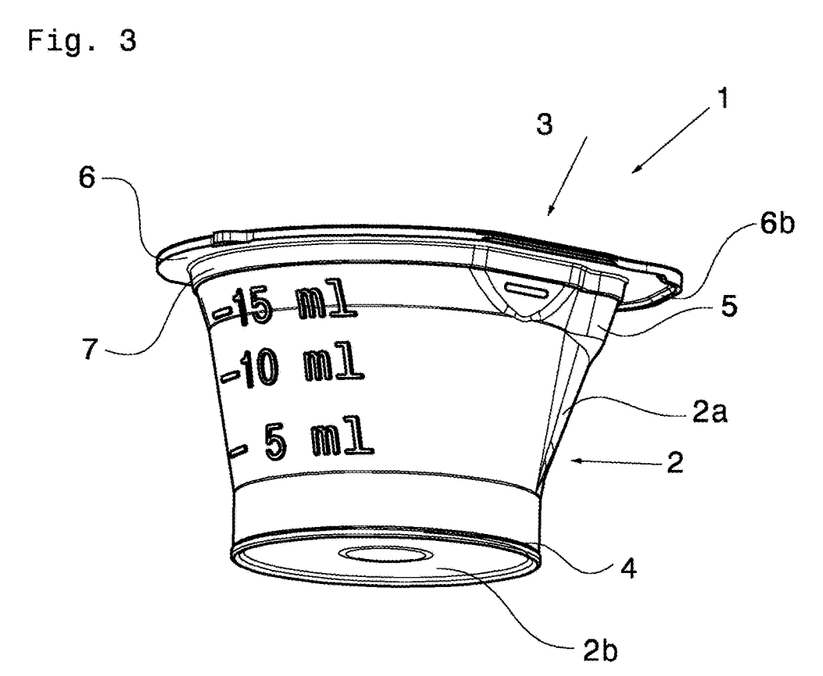

The sectional view in FIG. 2a shows a variant of the arrangement and embodiment of the edge part 6 with a snap/ring connection to the upper edge of the cup 2. On the edge of the cup 2 on the outside, a rounded projection 2d is provided, on which the edge part 6 sits on the outside in a diametrically opposed manner. A short edge part base piece 6c of the edge part 6 runs along the upper area of the cup wall outer side; the edge part 6 abuts the inner cup wall in a flush manner on the inside of the cup.

Figure 1:
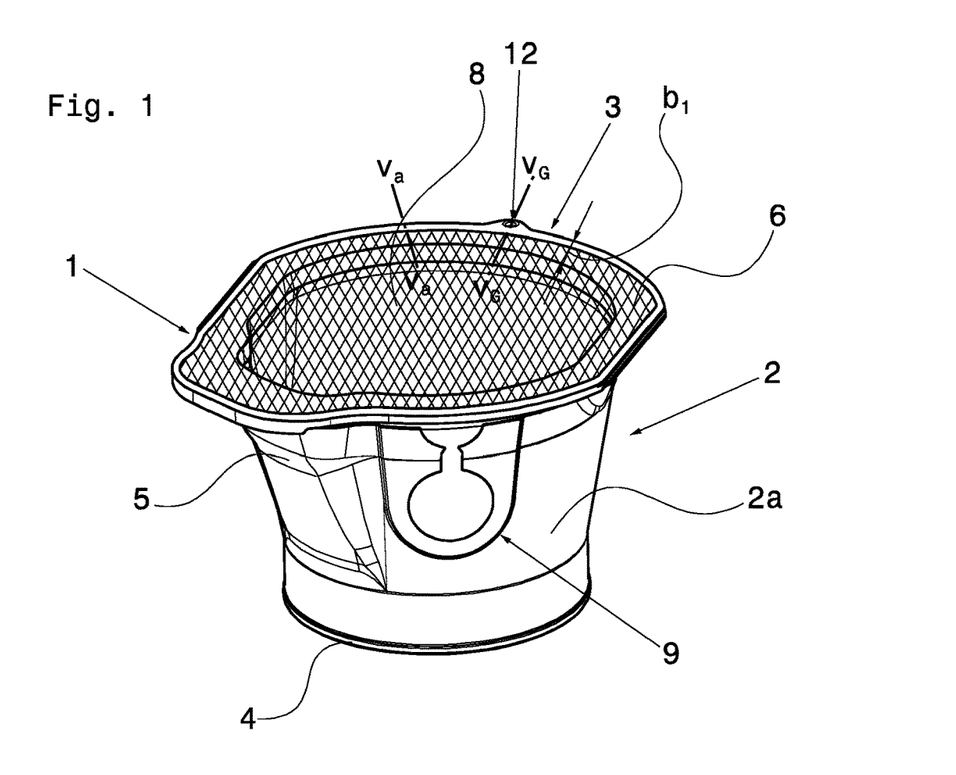
FIG. 1 to FIGS. 6, 2a and 5a various views and cross-sectional representations of an individual container in a ready-to-use state.
Figure 4:
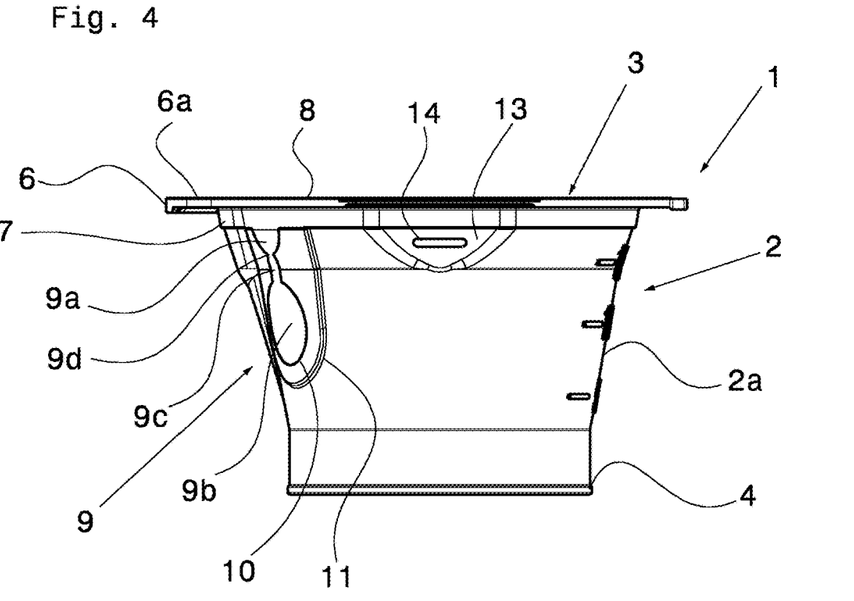
Figure 6:
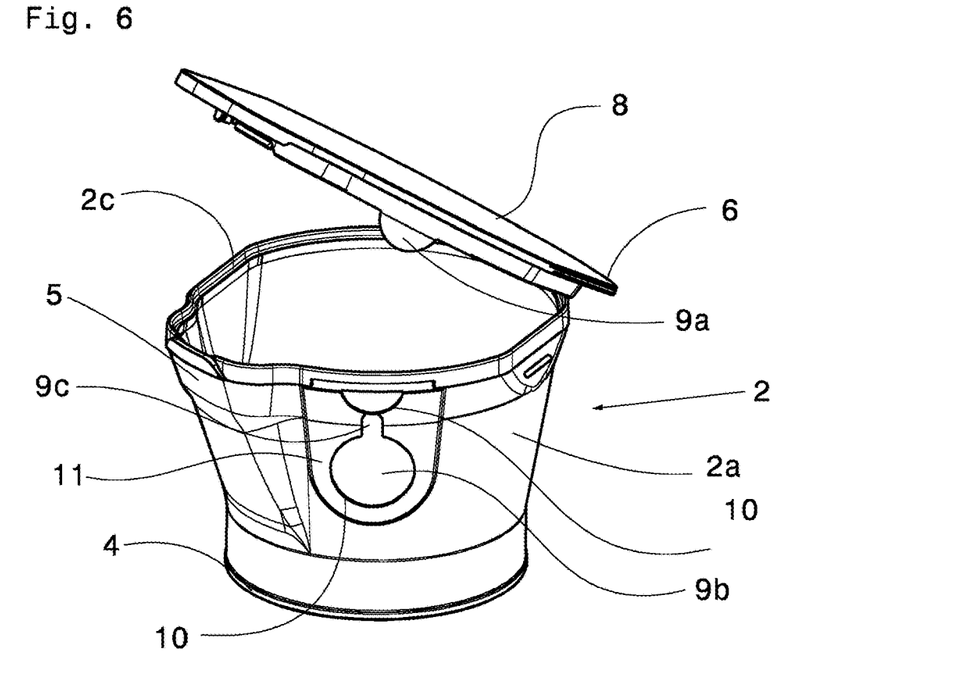

As is shown, for example, in FIGS. 1 and 4, the container 1 is provided with a tamper-proof seal 9, which is manufactured with the edge part 6 of the cover 3 as a single piece and a roughly circular sealing part 9a in the embodiment shown, which is on the lower edge of the edge part 6, which is connected, for example, to a circular sealing part 9b via a connection bar 9c. Between the connection bar 9c and the sealing part 9a, there is a predetermined breaking point 9d, in particular, a local material weakening. The connection bar 9c and the sealing parts 9a and 9b are positioned in a flat depression 10 adapted to the outer shape of these parts formed on the cup wall 2a, which is formed in a flat projection 11 designed locally. The outer surface of the projection 11 and the outer surface of the parts of the tamper-proof seal 9 abut within one another in a flush manner. When opening the cover 3, the predetermined breaking point 9b is separated; the sealing part 9a stays on the cover 3; the sealing part 9b and the connection bar 9c stay on the cup wall 2a, as shown in FIG. 6, so that it can be recognised even after re-attachment of the cover 3 that the container 1 has already been opened.

There are a plurality of options to design a tamper-proof seal. For example, FIGS. 7 and 7a, FIGS. 8 and 8a as well as FIGS. 9 and 9a show other variants.

Figure 7:
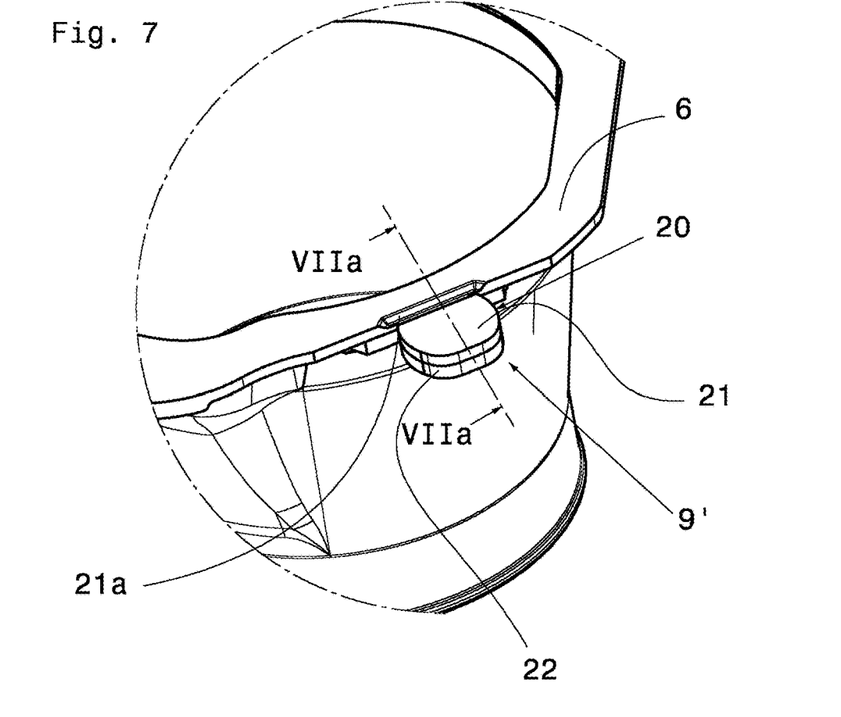
FIG. 7 and FIG. 7a (Section along VIIa-VIIa of FIG. 7), FIG. 8 and FIG. 8a (Section along the line VIIIa-VIIIa of FIG. 8) as well as FIGS. 9 and 9a (section along line IXa-IXa of FIG. 9), each an embodiment variant of a tamper-proof seal, FIG. 10 a linkage of a plurality of containers connected to each other, FIG. 11 and FIG. 12 detailed representations of FIG. 10 and FIG. 13 a plurality of containers stacked into each other each arranged within a container linkage.
Figure 7A:
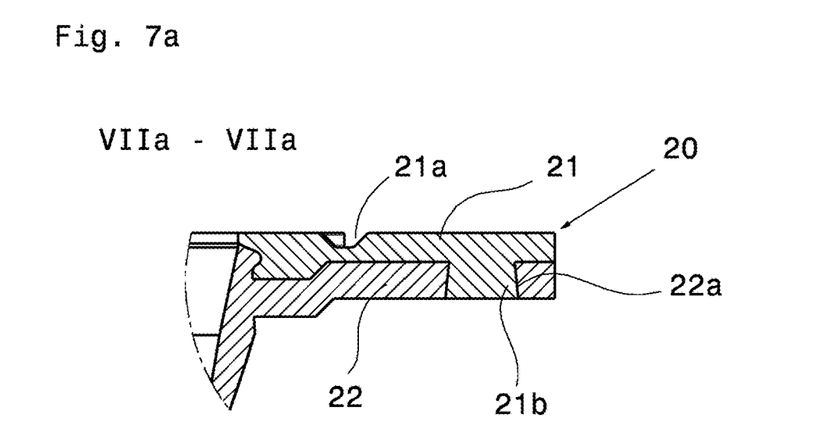
Figure 8:
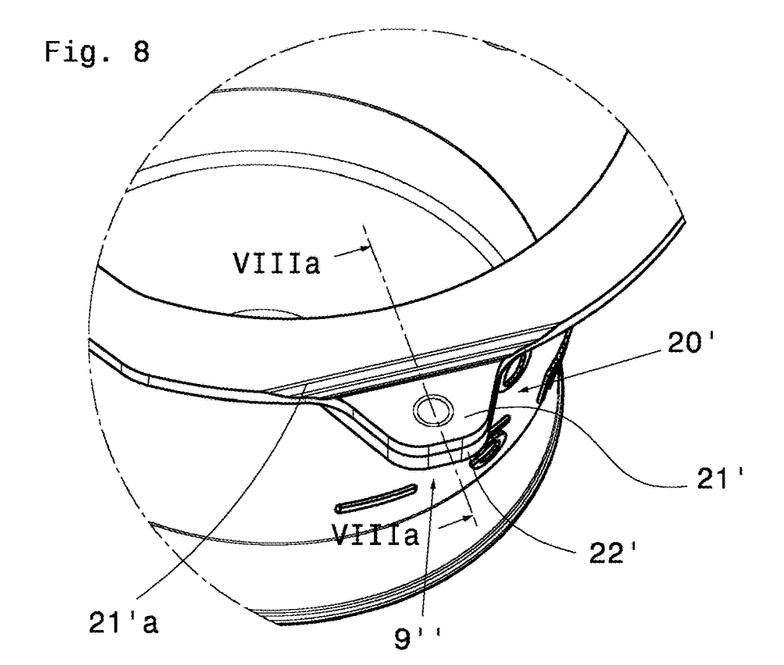
Figure 8A:
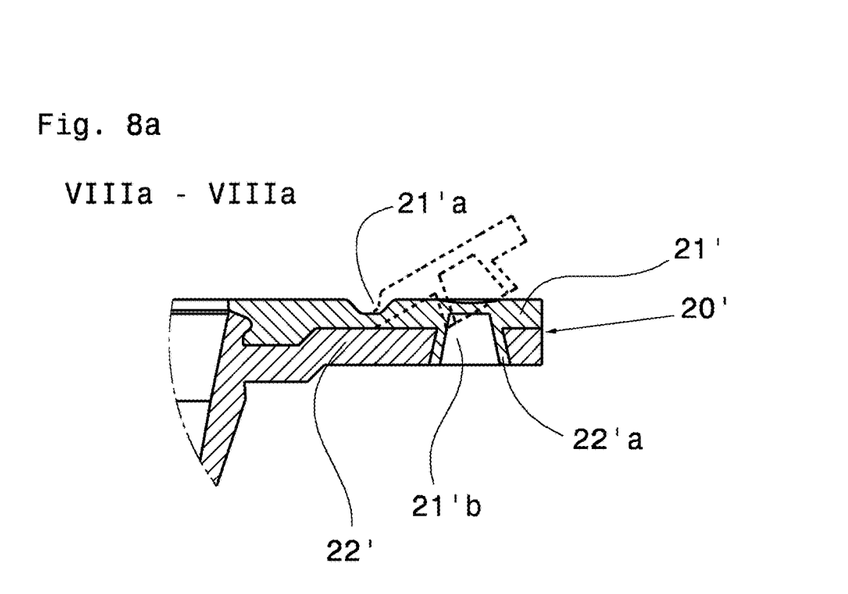

FIGS. 7 and 7a as well as FIGS. 8 and 8a each show an embodiment of a tamper-proof seal 9', 9'', where a two-layer tab 20, 20' sticks out from the edge part 6, which consists of an upper tab part 21, 21 made out of the material of the edge part 6 and a lower tab part 22, 22' made of the material of the cup 2. In the embodiment shown in FIGS. 7 and 7a, the upper tab part 21 is provided with a depression 21a forming a break area at the outer edge of the edge part 6. In the variant shown in FIGS. 8 and 8a, a depression 21'a is formed between the upper tab part 21' and the edge of the edge part 6, which forms a joint. On the lower side of the upper tab part 21, 21', a dovetailed anchor 21b, 21'b) is respectively formed in the cross section (FIG. 7a, 8a) for example, which sits in a diametrically opposed recess 22a, 22'a in the lower tab part 22, 22'. In FIGS. 7 and 7a, the embodiment is such, that both tab parts 21 and 22 are remain connected to each other and the upper tab part 21 is separated from the edge part 6 along the depression 21a when the cover 3 is opened for the first time. In the case of the variant shown in FIGS. 8 and 8a, the anchor 21'b detaches from the recess 22'a when the cover 3 is opened for the first time, however, no longer snaps into the recess 22' so that the upper tab part 21' sticks out upwardly from the edge part 6 in a slanting manner, as is indicated in FIG. 8a with dotted lines.

Figure 9:
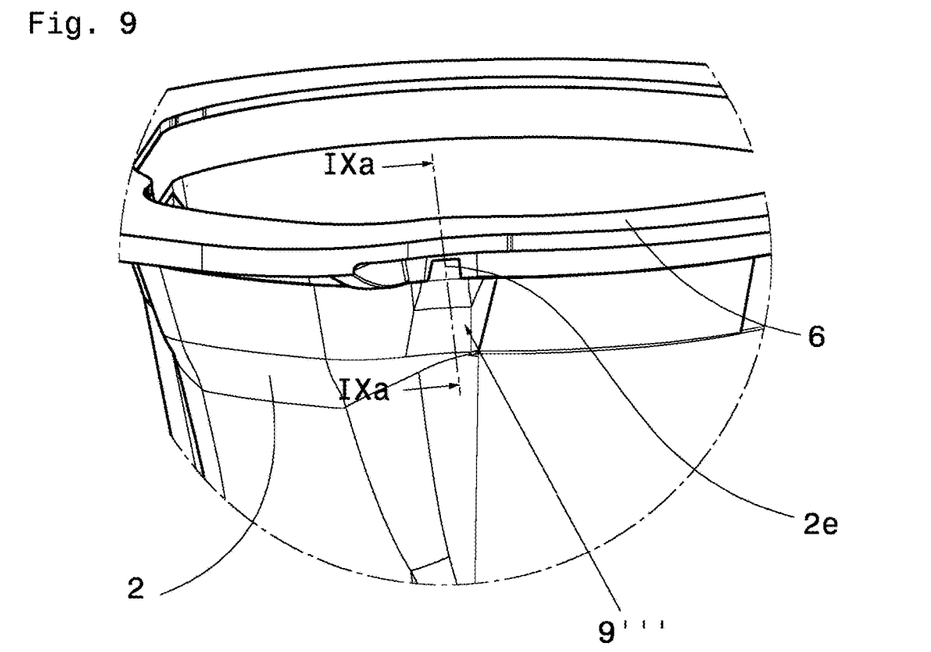
Figure 9A:
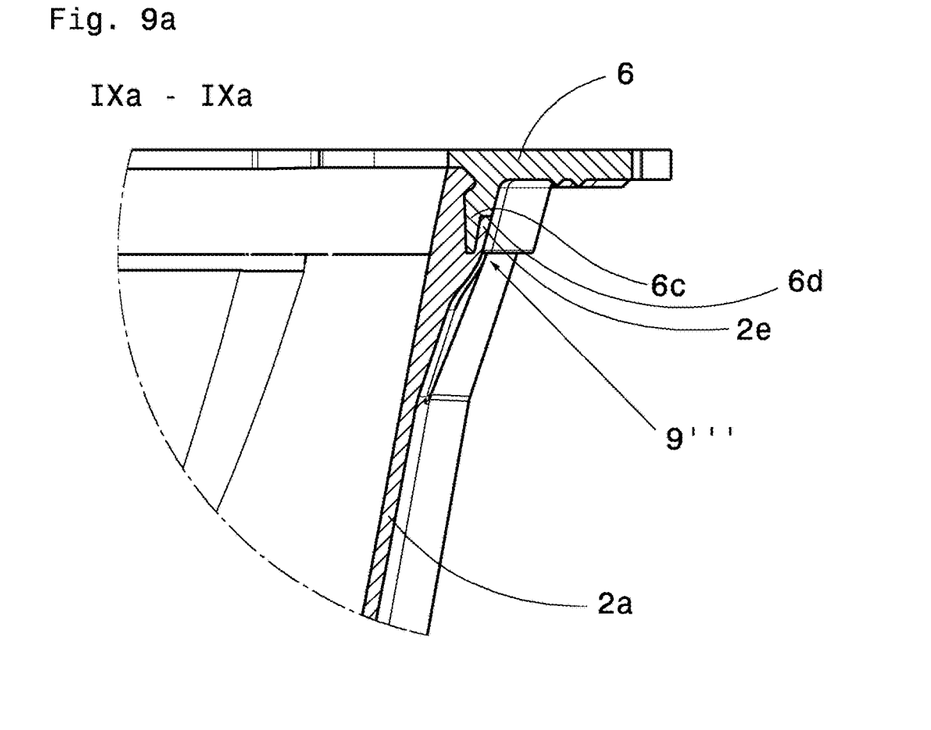

The variant shown in FIGS. 9 and 9a of a tamper-proof seal 9'' is suitable in the case of an embodiment with a ring/snap connection between the edge part 6 and the cup 2 in accordance with FIG. 2a. At a suitable area around the edge part 6, the edge part base piece 6c of the edge part 6 is somewhat widened so that under an undercut 6d formed on the edge part base piece 6c, a short and thin tab 2e can be made of the material of the cup 2. When opening the cover 3, the tab 2e plastically deforms outwardly and stays visibly deformed, even if the cover 3 is re-attached.

Preferably on its area opposite the spout 5, the edge part 6 is connected to the edge of the cup 2 by means of a hinge 12 (FIG. 5, FIG. 5a) so that an open cover 3 stays connected to the cup 2 and the container 1 can be easily re-sealed. The hinge 12 can be designed in such a way that the cover 3 can also be separated from the container 1.

Figure 5:
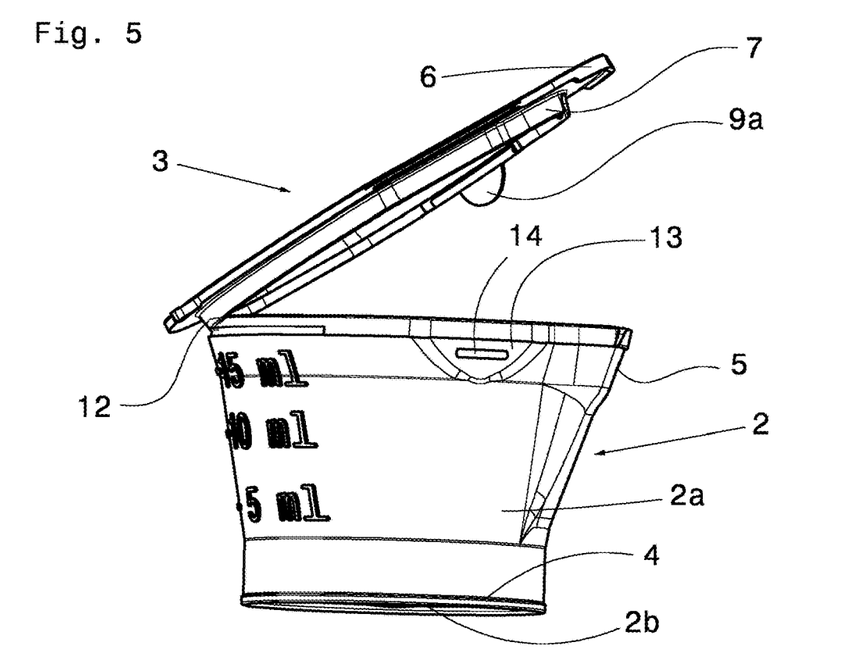
Figure 5A:
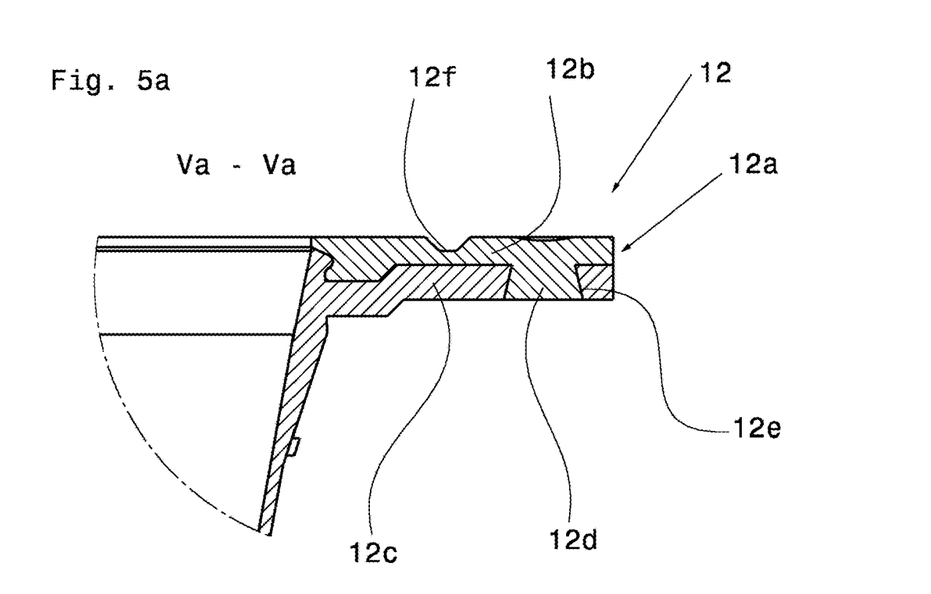

FIG. 5a shows a possible design of the hinge 12. A two-layer tab 12a is made of the material of the cup 2 and out of the material of the edge part 6, which has an upper tab part 12b and a lower tab part 12c. The upper tab part 12b consisting of the material of the edge part 6 has an anchor 12d on its underside, which is designed in an dovetailed manner in the embodiment shown in the cross section and sits in a diametrically opposed recess 12e of the lower tab part 12c. At the edge of the edge part 6, there is a depression 12f in the upper tab part 12b, which serves as a joint when the cover 3 is opened. The connection between both tab parts 12b, 12c is particularly so that the anchor 12d cannot be detached or can only be detached from the recess 12e with great effort.

Figure 5B:
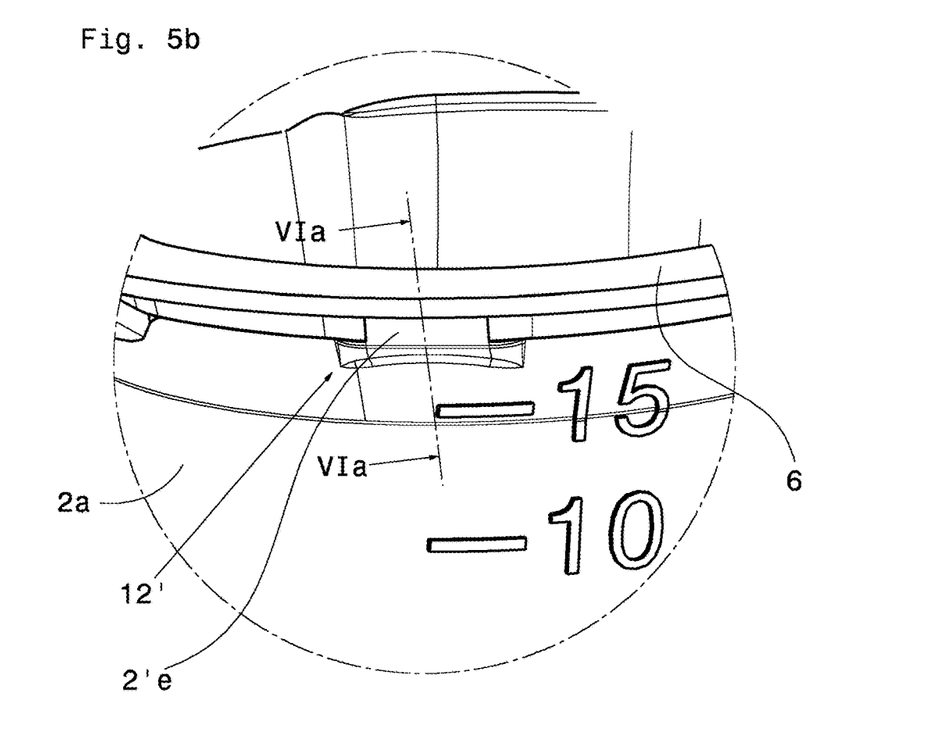
FIGS. 5b and 5c another embodiment variant of a hinge.
Figure 5C:
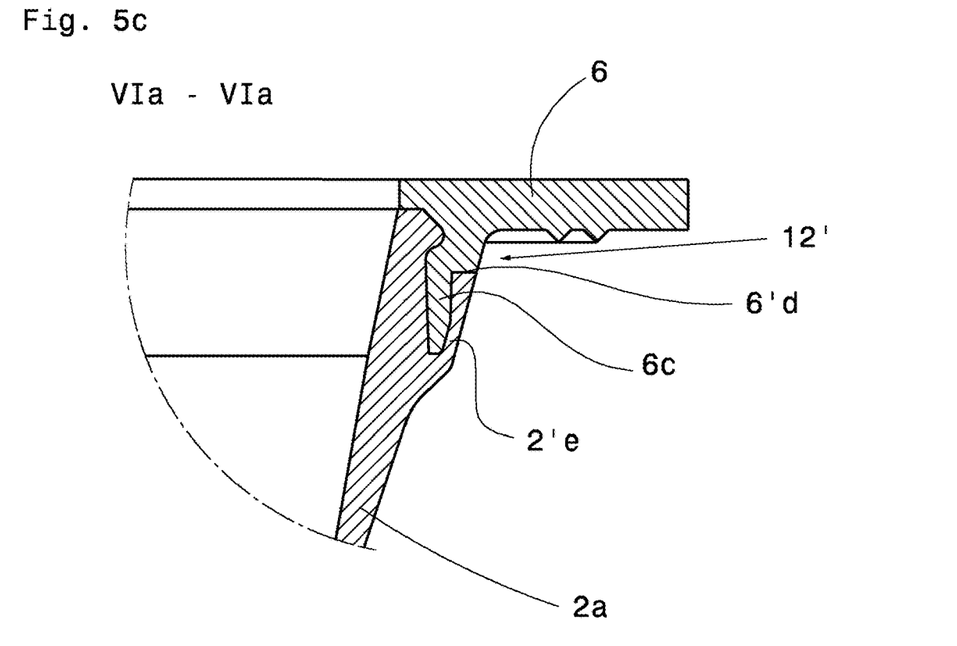

The variant shown in FIGS. 5b and 5c of a hinge 12' is suitable in the case of an embodiment with a ring/snap connection between the edge part 6 and the cup 2 in accordance with FIG. 2a. At the area concerned around the edge part 6, the edge part base piece 6c of the edge part 6 is somewhat widened so that under an undercut 6'd formed on the edge part base piece 6c, a thin tab 2'e can be made of the material of the cup 2. The embodiment is such that the lowest part of the edge part base piece forms the "pivot point" when the cover 3 is opened, wherein the tab 2'e remains connected to the edge part base piece 6c up to an opening angle of at least 90°. Removal of the cover 3 is however possible.

Other alternative or jointly provided embodiments can be provided in order to secure the container 1 on a tray. As FIGS. 4 and 5 show, for example, in particular, flattened areas 13 just under the upper cup edge can be formed on the cup wall 2a, in particular, on two areas lying opposite to each other, which each form an "undercut" for snapping on diametrically opposing protrusions of an opening in the tray. In the flattened areas 13, a short, narrow groove 14, several millimeters long, 2 mm in length can be respectively formed, that preferably runs parallel to the edge. A snap in part provided on the tray can be snapped into these grooves 14 for example.

Figure 10:
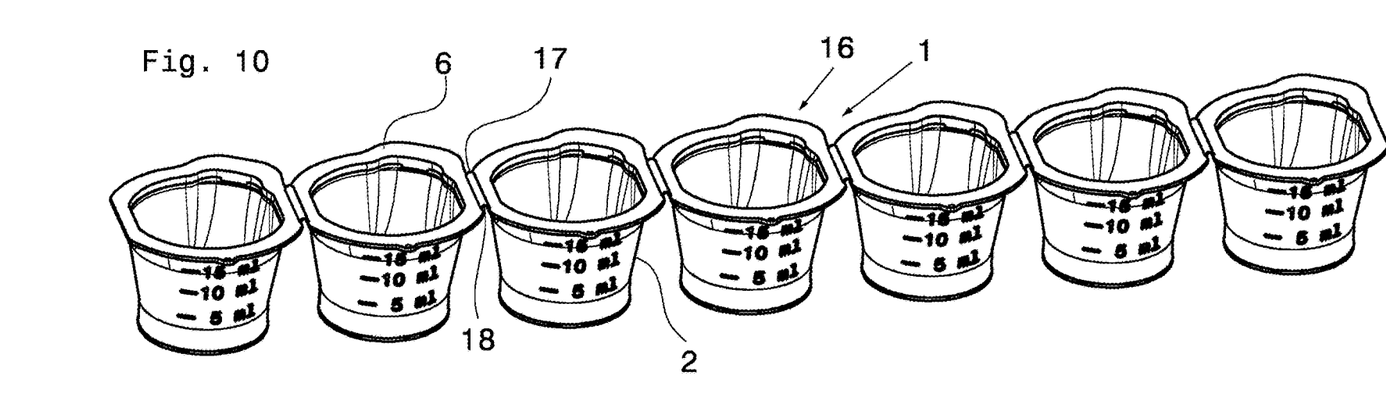
Figure 11:
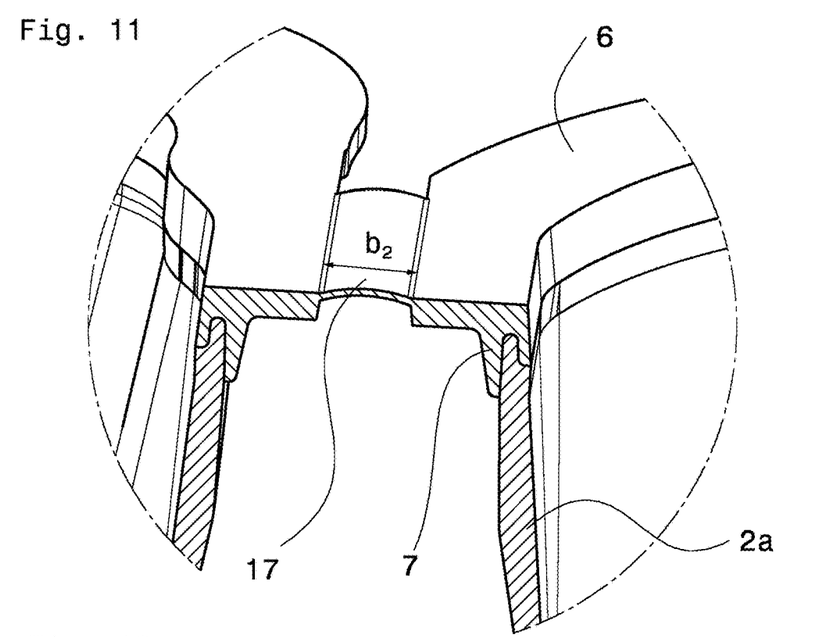
Figure 12:
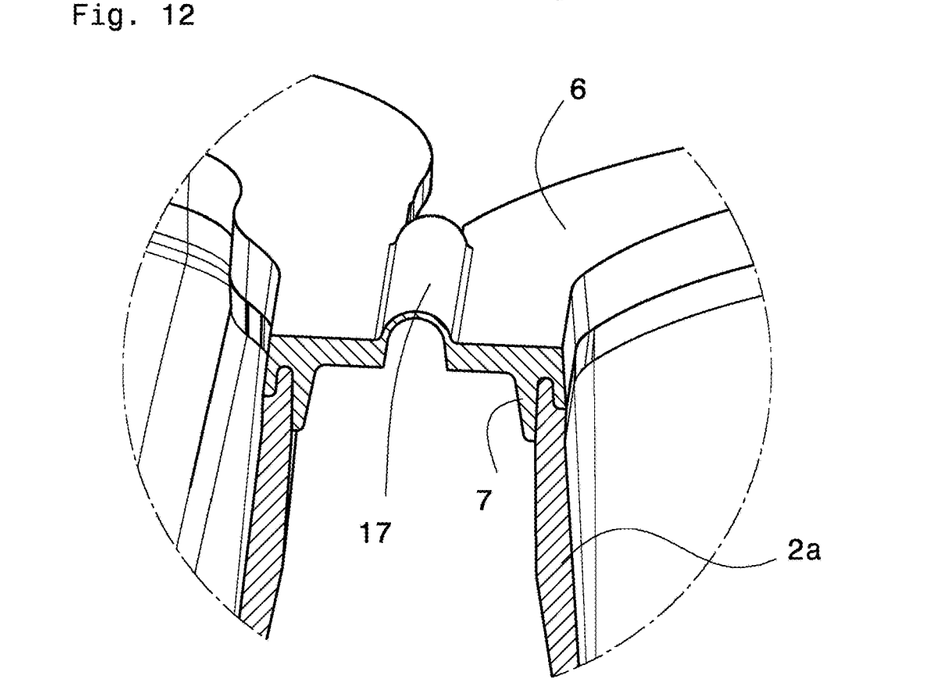

Manufacturing the containers 1 takes place in a two-component injection-moulding process (assembly injection moulding), whereby a linkage 16 is manufactured from a plurality of containers 1, for example, from seven containers 1. During the manufacturing process, for example, seven containers 1 are connected to their edge parts 6 to each other via thin spots 17. FIG. 10 shows such a linkage 16 immediately after its production. The thin spots 17 are located offset to those areas where the spouts 5 and the tamper-proof seals 9 are formed. In the case of a preferred embodiment of the invention, which is shown in FIG. 11 and FIG. 12, the thin parts 17 are upwardly arched plastic skins between the edge parts 6 of the adjacent containers 1. In the stretched state (FIG. 11), the plastic skins have a width $b_2$ of 1.0 mm to 1.5 mm, for example, and allow for a compensation of manufacturing tolerance within a certain longitudinal range, as shown in FIG. 11 and FIG. 12. The plastic skins can also be designed in a folded manner, thereby being able to be stretched. In particular, in these ways, manufacturing tolerances between the container linkage 16 and the tray can be compensated for. The thin parts 17 can principally also only be "dot-shaped" or bar-like connection points between the edge parts 6. The disconnecting or separating of the containers 1 can take place thermally when welding the sealing film 8, however this can also take place mechanically, for example, by means of punching or cutting.

A container linkage 16 can naturally comprise of more or less than seven containers 1.

Figure 13:
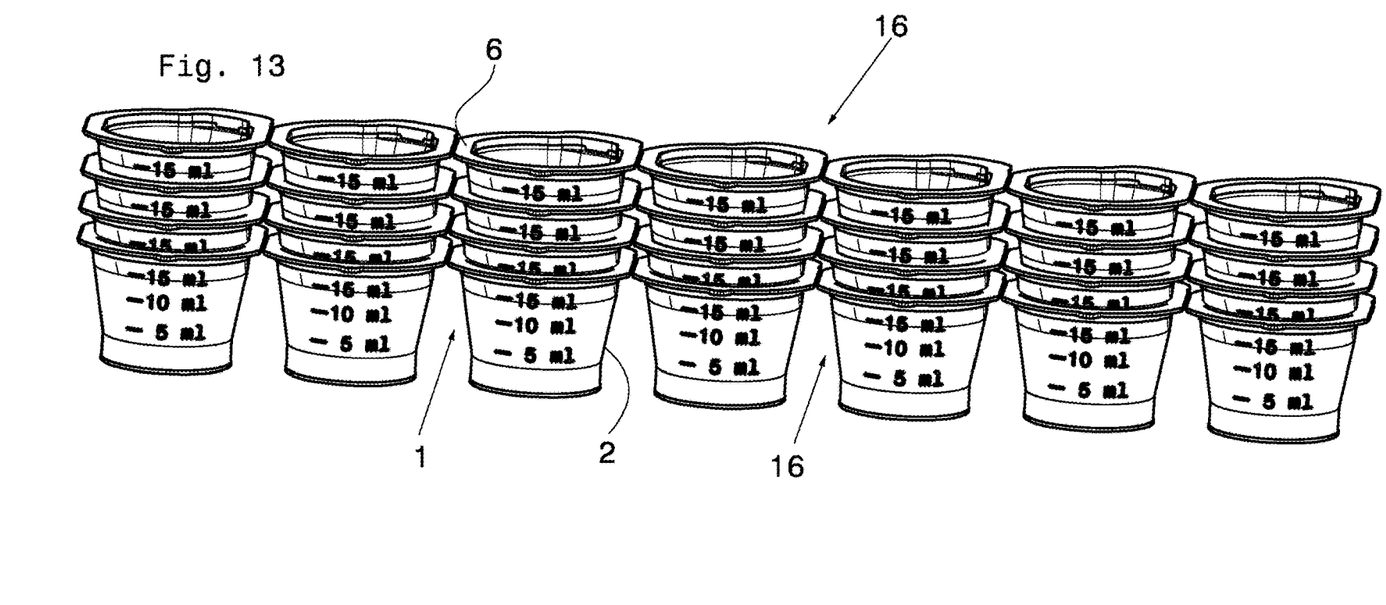

The containers 1 manufactured in the linkages 16 are, as is shown in FIG. 13, stacked into each other several times in a space-saving manner at the filling point, where medications are provided for filling, above all, to a pharmacy, a nursing service or the like. If the container linkages 16 should be filled with medications, in this way, a plurality of container linkages 16, for example, four to six, are positioned in a personalised tray and subsequently filled. After filling the containers 1, the sealing film 8 is attached, which is already labelled accordingly. The tray assigned to each patient is subsequently delivered.

REFERENCE NUMBER LIST

1 . . . Container
2 . . . Cup
2a . . . Cup wall
2b . . . Floor
2c . . . Section
2d . . . Projection
2e, 2'e . . . Tab
3 . . . Cover
4 . . . Foot
5 . . . Spout
6 . . . Edge part
6a . . . Surface
6b . . . Pull tab
6c . . . Edge part base piece
6d, 6'd . . . Undercut
7, 7' . . . Edge part base piece
8 . . . Sealing film
9, 9', 9", 9'" . . . Tamper-proof seal
9a . . . Sealing part
9b . . . Sealing part
9c . . . Connection bar
9d . . . Predetermined breaking point
10 . . . Depression
11 . . . Projection
12, 12' . . . Hinge
12a . . . Tab
12b . . . Tab part
12c . . . Tab part
12d . . . Anchor
12e . . . Recess
12f . . . Depression
13 . . . Flattened area
14 . . . Groove
16 . . . Linkage
17 . . . Thin point
20, 20' . . . Tab
21, 21' . . . Upper tab part
21a, 21'a . . . Depression
21b, 21'b . . . Anchor
22, 22' . . . Lower tab part
22a, 22'a . . . Recess
$b_1$ . . . Width
$b_2$ . . . Width

The invention claimed is:

1. A container for the packaging of liquid, pasty or solid substances or of small parts, in particular pharmaceutical or medical products, the container comprising:
    a cup made of plastic having a cup wall with an inside, an outside, and an upper edge surrounding a top of the cup wall; and
    a cover made of plastic being positioned on the cup in a liquid-tight manner, wherein the cover comprises:
        an annular edge part surrounding and seated on the upper edge of the cup with a moulded interface between the edge part and the cup, the edge part having a level surface and a projection extending away from the level surface, the projection being positioned in contact with the outside of the top of the cup wall, the edge part having an inside edge that is flush with the inside of the cup wall;
        a sealing film that is connected by a weld that is liquid-tight to only the level surface of the edge part to cover an opening in the edge part,
    and wherein the cup is made together with the edge part of the cover in a two-component injection moulding process to provide the moulded interface that is liquid-tight and so that the cover is detachable and re-attachable to the cup.

2. The container according to claim 1, wherein the edge part of the cover is connected liquid-tight to the upper edge of the cup by means of a tongue and groove connection in a re-attachable manner.

3. The container according to claim 1, wherein the edge part of the cover is connected liquid-tight to an upper edge of the cup by means of a snap connection in a re-attachable manner.

4. The container according to claim 1, wherein the edge part of the cover protrudes beyond the upper edge of the cup toward the outside.

5. The container according to claim 1, wherein the moulded interface has at least one tamper-proof seal, which visibly changes an outer appearance when opening the cover for the first time.

6. The container according to claim 5, wherein the tamper-proof seal has at least one component, which is separated or detached or that deforms when removing the cover for the first time.

7. The container according to claim 1, wherein the cup wall is formed on an area toward the upper edge of the cup and toward the outside, thereby forming a spout.

8. The container according claim 1, wherein the edge part of the cover is widened on a local level at one point thereby forming a pull tab to open the cover.

9. The container according to claim 1, wherein the edge part of the cover has a hinge connection to the upper edge of the cup at one point.

10. The container according to claim 1, wherein on the outside of the cup wall, in particular near the upper edge, there is a flattened area, which forms a type of undercut.

11. The container according to claim 10, wherein in the flattened area, a groove is formed, which, in particular, runs parallel to the upper edge of the cup.

12. An assembly comprising a plurality of the containers of claim 1 arranged in a row, for packaging of liquid, pasty or solid substances or of small parts, wherein each container has the cup and the cover edge part, surrounding and seated on the upper edge of the cup and being positioned on the cup in a liquid-tight manner, where the cover edge parts of adjacent containers are respectively connected to each other on a local level via at least one thin spot made of the material of the edge parts.

13. The assembly according to claim 12, characterized in that the at least one thin spot is a designed as bar.

14. The assembly according to claim 12, characterized in that the at least one thin spot is a designed as an arched or folded plastic skin.

15. The assembly according to claim 12, characterized in that the cups are manufactured together with the edge parts in a two-component injection-moulding process so as to form a moulded interface there between.

* * * * *